United States Patent
Foster et al.

(10) Patent No.: US 9,535,664 B1
(45) Date of Patent: Jan. 3, 2017

(54) COMPUTERIZED SOFTWARE DEVELOPMENT PROCESS AND MANAGEMENT ENVIRONMENT

(71) Applicants: William Knight Foster, Saratoga, CA (US); Mark W. Publicover, Saratoga, CA (US)

(72) Inventors: William Knight Foster, Saratoga, CA (US); Mark W. Publicover, Saratoga, CA (US)

( * ) Notice: Subject to any disclaimer, the term of this patent is extended or adjusted under 35 U.S.C. 154(b) by 0 days.

(21) Appl. No.: 14/693,696

(22) Filed: Apr. 22, 2015

Related U.S. Application Data

(60) Provisional application No. 61/983,008, filed on Apr. 23, 2014.

(51) Int. Cl.
*G06F 9/45* (2006.01)
*G06F 9/44* (2006.01)

(52) U.S. Cl.
CPC .............. *G06F 8/30* (2013.01); *G06F 8/427* (2013.01)

(58) Field of Classification Search
CPC .................................. G06F 8/30; G06F 8/427
USPC .................... 717/111–112, 140–145
See application file for complete search history.

(56) References Cited

U.S. PATENT DOCUMENTS

| | | | |
|---|---|---|---|
| 5,649,200 A | 7/1997 | Leblang et al. | |
| 5,805,889 A | 9/1998 | Van De Vanter | |
| 5,960,202 A | 9/1999 | Granston et al. | |
| 6,292,938 B1 | 9/2001 | Sarkar et al. | |
| 6,535,886 B1 * | 3/2003 | Koontz | G06F 17/2205 |
| 6,687,896 B1 * | 2/2004 | Royce | G06F 8/48 |
| | | | 717/141 |
| 7,219,338 B2 * | 5/2007 | Venter | G06F 8/427 |
| | | | 717/140 |
| 7,293,261 B1 * | 11/2007 | Anderson | G06F 8/52 |
| | | | 717/104 |
| 7,296,264 B2 | 11/2007 | Zatloukal et al. | |
| 7,340,726 B1 | 3/2008 | Chelf et al. | |
| 7,402,697 B2 * | 7/2008 | Murthy | C07C 233/18 |
| | | | 564/202 |
| 7,478,367 B2 | 1/2009 | Morgan et al. | |
| 7,584,461 B2 * | 9/2009 | Plum | G06F 11/3624 |
| | | | 717/143 |

(Continued)

OTHER PUBLICATIONS

Shen et al, "Dependency Parse Reranking with Rich Subtree Features", IEEE/ACM Transactions on Audio, Speech, and Language Processing, vol. 22, No. 7, pp. 1208-1218, 2014.*

(Continued)

*Primary Examiner* — Anil Khatri
(74) *Attorney, Agent, or Firm* — Klarquist Sparkman, LLP

(57) ABSTRACT

A software development system maps the organization and storage of software or code of a project in a structured database instead of in a series of discrete files and directories in a traditional file system. The code is analyzed and parsed to create parse trees for storage in the structured database. Individual software developers may be presented with the code taking the appearance of a traditional file based representation with each developer being able to have their own customized representation or view of the code to best suit their needs, preferences and current task. To facilitate migration to such system, tools are provided to export a snapshot of the structured database into discrete files in order that existing file based tools may continue to be used.

19 Claims, 5 Drawing Sheets

(56) References Cited

U.S. PATENT DOCUMENTS

| | | | | |
|---|---|---|---|---|
| 7,636,914 | B1* | 12/2009 | Johnson | G06F 8/20 717/108 |
| 7,647,363 | B2 | 1/2010 | Walsh et al. | |
| 7,853,936 | B2* | 12/2010 | Levi | G06F 17/2775 707/999.006 |
| 8,145,474 | B1* | 3/2012 | Daily | G06F 11/2257 704/10 |
| 8,225,402 | B1* | 7/2012 | Averbuch | H04L 63/14 717/141 |
| 8,429,179 | B1* | 4/2013 | Mirhaji | G06F 17/30312 707/756 |
| 8,572,560 | B2 | 10/2013 | Drissi et al. | |
| 8,572,572 | B2 | 10/2013 | Morgan et al. | |
| 8,762,969 | B2* | 6/2014 | Meijer | G06F 8/427 717/140 |
| 8,850,415 | B2* | 9/2014 | Huuck | G06F 11/3608 707/999.003 |
| 8,949,804 | B2* | 2/2015 | Duftler | G06F 21/52 717/143 |
| 9,038,035 | B2* | 5/2015 | Shachar | H04L 29/06 717/142 |
| 9,317,566 | B1* | 4/2016 | L'Huillier | G06F 17/3053 |
| 2002/0199170 | A1 | 12/2002 | Jameson | |
| 2007/0011654 | A1 | 1/2007 | Opperman | |
| 2009/0328016 | A1 | 12/2009 | Ng et al. | |
| 2012/0331439 | A1 | 12/2012 | Zimmermann et al. | |
| 2013/0139132 | A1 | 5/2013 | Kass et al. | |
| 2013/0152061 | A1 | 6/2013 | Golde et al. | |

OTHER PUBLICATIONS

Chan et al, "Tree Topological Features for Unlexicalized Parsing", ACM, 117-125, 2010.*

Ertl et al, Fast and Flexible Instruction Selection with On-Demand Tree-Parsing Automata, ACM, pp. 52-60, 2006.*

Singh et al, "Tool for Generating Code Metrics for C# Source Code using Abstract Syntax Tree Technique" ACM SIGSOFT Software Engineering Notes, vol. 38 No. 5, pp. 1-6, 2013.*

Holmes, "SQL Text Parsing for Information Retrieval", ACM, pp. 496-499, 2003.*

Leung et al, "Interactive Parser Synthesis by Example", ACM, pp. 565-574, 2015.*

Shen et al, "Dependency Parse Rerankingwith Rich Subtree Features", IEEE/ACM Transactions on Audio, Speech, and Language Processing, vol. 22, No. 7, pp. 1208-1218, 2014.*

Ryu, "Parsing Fortress Syntax", ACM, pp. 76-84, 2009.*

* cited by examiner

Representative atomic expression tree

Example C++ atomic expression tree

COMPUTERIZED SOFTWARE DEVELOPMENT PROCESS AND MANAGEMENT ENVIRONMENT

CROSS REFERENCE TO RELATED APPLICATIONS

This application claims the benefit of the following patent application:
U.S. Provisional Application No. 61/983,008, filed Apr. 23, 2014, which is incorporated herein by reference in its entirety.

FIELD OF THE INVENTION

This invention relates to computerized methods and systems for developing computer software.

BACKGROUND

Software programming is typically performed by the use of high level programming languages in order to provide leverage to software developers and allow them to work at a higher level of abstraction than is directly afforded by the underlying hardware upon which their software will ultimately execute. By allowing software developers to work at a higher level of abstraction and utilizing the computer to map this abstraction into binary that may be executed upon a particular piece of hardware (e.g. by use of a compiler), the software developers are able to create ever more complex systems of code and achieve higher levels of productivity and reduced rates of errors or the introduction of bugs.

The present standard of organizing software systems into groups of files is a practice that reflects the historical needs of the computer more than the needs of the software developer. Accordingly there is a need for improved software development systems that better support the needs of the software developer.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Embodiments disclosed herein facilitate software development by storing software code in a database that is incorporated into an Integrated Development Environment (IDE). Software development is facilitated and productivity is thereby improved.

The Software Database representation of software under development allows for individual software developers to be presented with the appearance of a traditional file based representation but allows for each developer to have their own customized representation or view into the Software Database to best suit their needs, preferences, and current task. To facilitate migration to such system, tools are provided to export a snapshot of the Software Database into discrete files in order that existing file based tools may be used and their output references to locations within such files be mapped back into the Software Database for presentation to the developer. Each user's view into the software may be customized to match their personal preferences for aspects of the software that do not impact its meaning to the computer but which may aid the developer in efficiently understanding the software or code. For example, customized views may vary in their typographic choices for indentation, whitespace, coloring (e.g. syntactical), or language localization (e.g. English or French). Additionally, depending upon a developer's current task, they may wish to reorder the presentation of software among atomic expressions whose relative order does not impact the software's meaning to the computer for the purpose of moving a focus areas of the software (e.g. the uses of a variable) to have closer proximity to each other. Finally, a developer may wish to query/filter what information they see to best fit their current task. Such filtering may be applied to whole atomic expressions of software (e.g. classes or function definitions) or, within an atomic expression, to the portions that may be irrelevant to the current task and thus may be elided.

It is to be understood that both the foregoing and the following descriptions are exemplary and explanatory only and are not intended to limit the claimed invention or application thereof in any manner whatsoever.

DETAILED DESCRIPTION

1. Table of Contents

Figure 1:
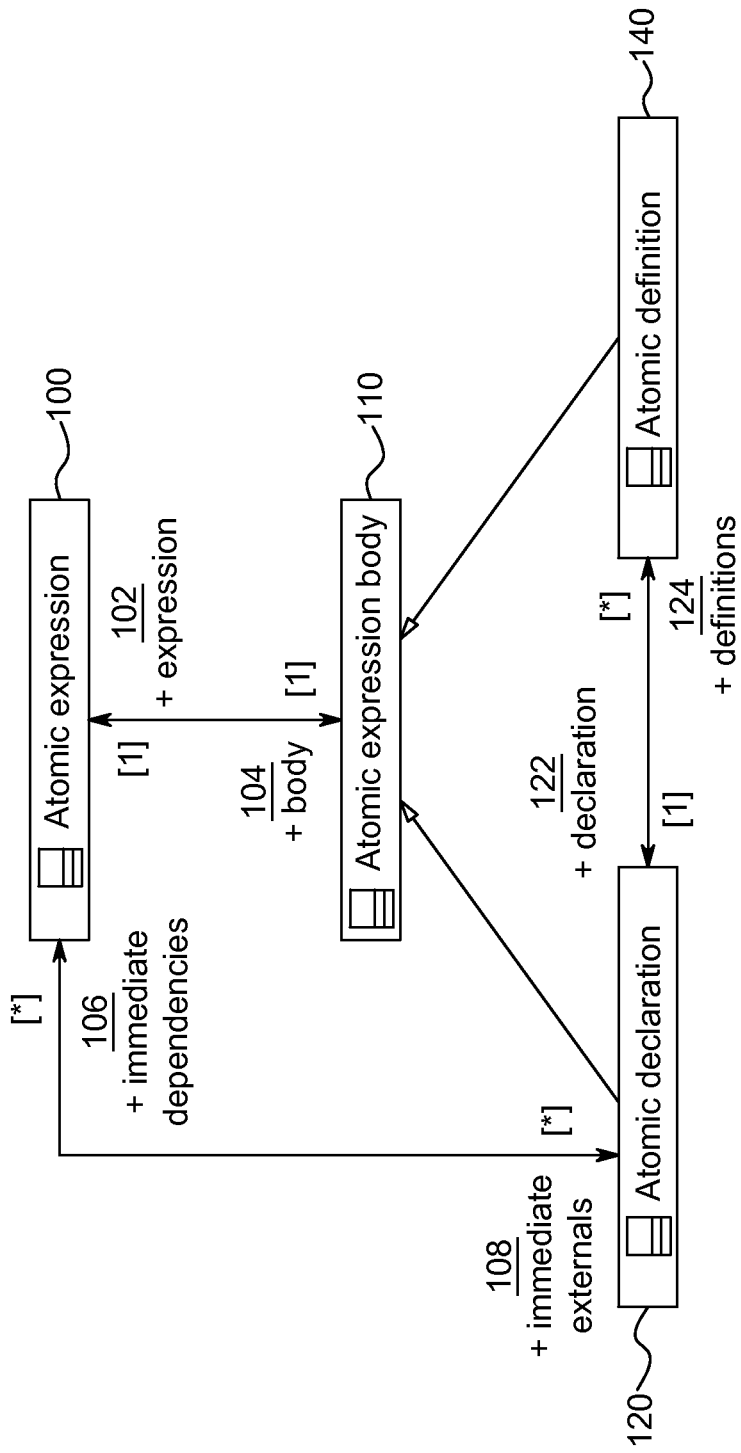
FIG. 1 illustrates, in the form of a Unified Modeling Language 2 (UML 2) class diagram an example representation of an Atomic Expression.

1. Table of Contents
2. Key Terms
3. Software Database Representation
3.1. Database Schema
3.2. Atomic Expression Tree
3.3. C++ Language Example
4. Database Projection into Smart Editor
5. Database Projection into Discrete Files
6. Build Process
7. Static Code Analysis
8. Code Refactoring
9. Code Review and Rating
10. Version Control
11. Alternatives

2. Key Terms

Certain words within the description of the disclosed system have specific meanings, and are generally capitalized within the text of the description. These words whether in singular or plural form, shall have the meanings as defined below.

Atomic Expression:
: A top-level expression within a language preceded by all of the declarations required by external references made from the expression, which may be processed by a compiler as a complete compilation unit. Such external references are ultimately satisfied by other Atomic Expressions at link time.

Atomic Expression Body:
: The portion of an Atomic Expression that provides a top-level expression that either defines or declares an atomic language construct and is represented by its parse/syntax tree and is paired with a possibly empty externals portion and together they make an Atomic Expression.

Atomic Expression Declaration:
: A kind of an Atomic Expression Body that provides a declaration of one or more top-level expressions each of which has an Atomic Expression Body. An Atomic Expression Declaration includes an unordered set of references to the one or more Atomic Expression Definitions it declares. An Atomic Expression Declaration, being an Atomic Expression, may itself have Atomic Expression Externals that are resolved by other Atomic Expression Declarations.

Atomic Expression Definition:
: A kind of an Atomic Expression Body that provides a definition of a top-level expression without any declaration of external references made within such expression. An Atomic Expression Definition includes a reference to its Atomic Expression Declaration. Other Atomic Expressions that refer to the definition as well as the definition itself include that Atomic Expression Declaration in their Atomic Expression Externals. Sometimes referred to as simply Atomic Definitions.

Atomic Expression Externals:
: The portion of an Atomic Expression that resolves the external references made by the Atomic Expression Body. Atomic Expression Externals are composed of an unordered set of references to Atomic Expression Declarations. Any dependent declarations are themselves externals of the immediate declaration that requires them. As such, a tree may be constructed from a given Atomic Expression wherein the first level child nodes are the immediate externals of the given expression and each such immediate external child node may themselves require externals, each of which creates another tree node beneath them. Sometimes referred to as simply Atomic Externals.

Atomic Expression Tree:
: The tree resulting from an Atomic Expression Definition and branching down into its required declarations wherein such declarations may themselves recursively require further declarations.

Code:
: A term which is synonymous with software, whereby the behavior of a computer application or program is defined.

Human Database:
: A repository of conventions desired by software developers to be adhered to when viewing a Software Database. Conventions include how typographic conventions such as line breaks and indentation are inserted as well as the rules for coloring, font, and size of software text. Additionally included are the names of objects as presented to developers that may include translations to other languages such as Spanish or Japanese or personal preferences within a language by a user.

Localization:
: The process of projecting a Software Database into a human readable form (e.g. a text file) for a specific region, language, and/or preference by mapping the syntax, whitespace, identifiers and reserved words to their representation for that region, language, and/or preference as specified in a Human Database.

Software Database:
: A repository of software wherein instead of storing the software in traditional discrete files on a computer, the software is instead stored in a structured database, typically an object oriented database, that represents all the information of a traditional software source file but instead of just a stream of characters it builds up tokens that are organized into higher level patterns which have relationships between each other recorded in the database. In the purest sense, objects only have unique identities and any names associated with them are part of the Human Database.

Subexpression:
: A part of an Atomic Expression Body that corresponds to a subtree in a parse tree—that is, some node in a parse tree plus all of its descendants. A subexpression is a proper subexpression if it is not the entire expression.

Query:
: A precise request for Code retrieval from a Software Database according to the rules of the Human Database. For example, a request to see the software for all the functions currently on the stack in the debugger according to a developer's preferences of English, camelCaseNaming, and nested indentation of two spaces per level.

FIG. 1 illustrates, in the form of a Unified Modeling Language 2 (UML 2) class diagram an example representation of an Atomic Expression. An Atomic Expression 100 has a public relationship named "immediate externals" of zero to many Atomic Expression Declarations 120. An Atomic Expression 100 also has a public relationship named "body" 104 of exactly one Atomic Expression Body 110. An Atomic Expression Body 110 may be either an Atomic Declaration 120 or an Atomic Definition 140. An Atomic Expression Body 110 has a public relationship named "expression" 102 of exactly one Atomic Expression 100 for which it is the "body" 104. An Atomic Definition 140 has a public relationship named "declaration" 122 of exactly one Atomic Declaration 120. An Atomic Declaration 120 has a public relationship named "definitions" 124 of zero to many Atomic Definitions 140 for which it is the "declaration" 122. An Atomic Declaration 120 also has a public relationship named "immediate dependencies" 106 of zero to many Atomic Expressions 100 for which it is one of the "immediate externals" 108.

3. Software Database Representation

The software development system disclosed herein advantageously maps the organization and storage of software or Code of a project in a database instead of in a series of discrete files and directories in a traditional file system. Therefore, the system disclosed herein replaces the present methodology with a system that better meets the needs of the developer and allows them to work at a higher level of abstraction. At the same time, the system, under the covers, maps the database representation into a traditional file based representation that is more suited for existing computer tools such as those based upon the existing file based system of software organization commonly used in software projects today. Such accommodation facilitates the adoption of this new methodology by providing a bridge back and forth to a representation compatible with existing tools so that developers need not do without any of their existing tools before such tools are adapted to work directly with a database representation centric methodology as described herein.

3.1. Database Schema

A database schema is created for a given programming language (e.g. C++, Lisp, or Python) that reflects the rules and constructs of the given programming language. Such representations already exist today in existing compiler technologies in what is often termed the front-end of a compiler that builds an internal representation of the software provided by a developer. For example, the Unix tools Flex and Bison allow a programmer to define parsers for file formats such as C++. Flex is a lexical analyzer and breaks up a file into tokens. Bison is a parser generator that takes the tokens coming out of Flex and performs syntactic analysis according to the formal grammar of the language being parsed, such as C++. The database schema includes objects for both the tokens and the parse tree or structural representation of the tokens within the meaning of the language, such as C++. Software developers may still add new software or edit existing software by manipulating traditional text files whereby the result of their work may be lexically analyzed and parsed to create an updated parse tree that is stored in the Software Database. When modifying or viewing Code, the parse tree stored in the database may be converted back into any textual representation whose parse tree is isomorphic to the original stored in the Software Database. The selection of a particular textual representation may be based upon preferences of the software developer working on the Code.

Figure 2:
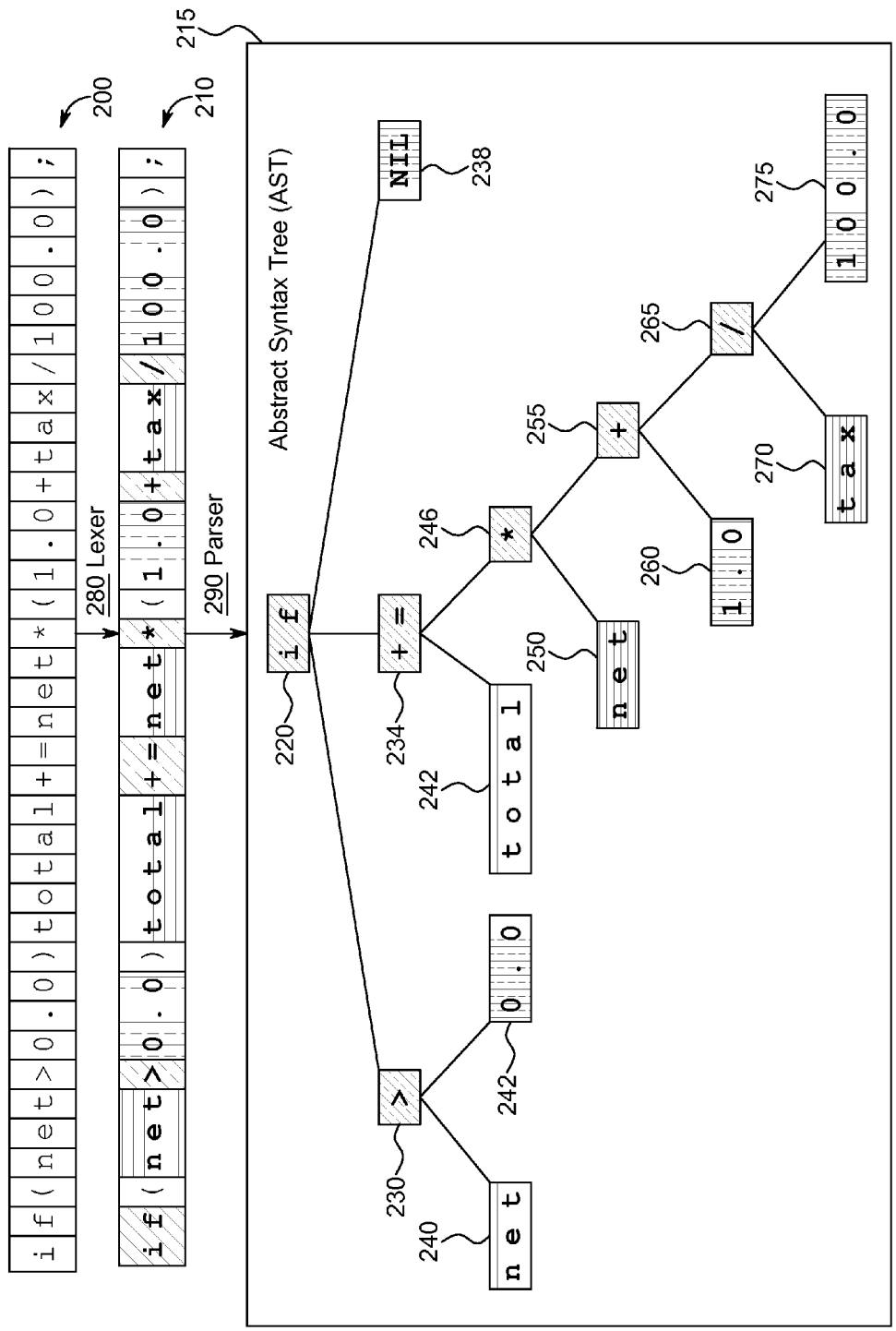
FIG. 2 illustrates a scanner and parser example in the context of the C programming language.

FIG. 2 illustrates a scanner, lexer, and parser example in the context of the C programming language. Starting from the sequence of characters 200 that correspond to an exemplary Atomic Expression Body 110 that may be found in an exemplary C program: "if (net>0.0) total+=net*(1.0+tax/100.0);", the scanner reads the series of characters 200 and passes them to the lexer 280 that composes them into a sequence of tokens 210 and categorizes each token, e.g. as identifier, reserved word, number literal, or operator. The parser 290 transforms the sequence of tokens 210 to create an abstract syntax tree (AST) 215, which is then treated by the remaining compiler phases. For example, abstract syntax tree contains a root node 220 corresponding to the "if" token in 210 and subnode 230 corresponding to token ">" and subnode 234 corresponding to token "+=" and nil subnode 238 having no corresponding token, being that no "else" clause was supplied in the C program. The lexer 280 and parser 290 handle the regular and properly context-free parts of the grammar for C, respectively. An example of creating a parse tree 215 with all information from the source Code is disclosed in US Pat. Publication No. 20130152061 A1 (Published 2013 Jun. 13), for a "Full fidelity parse tree for programming language processing".

Figure 3:
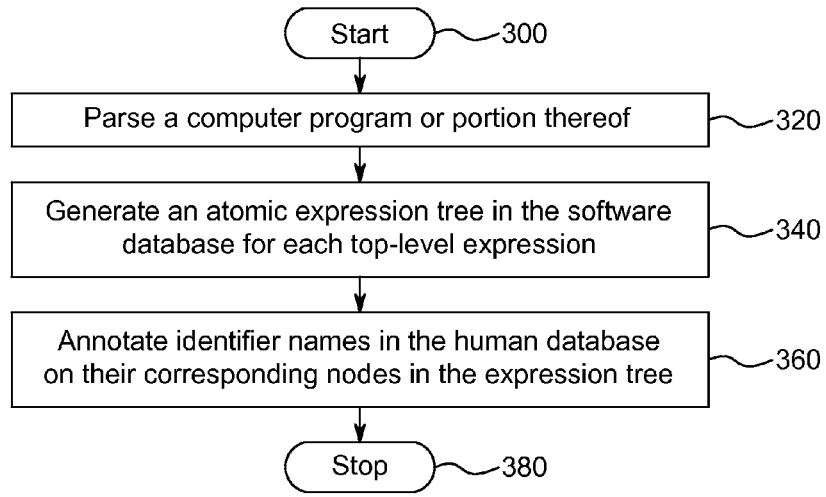
FIG. 3 illustrates a block diagram of a system that facilitates computer program processing in accordance with an aspect of the disclosure.

FIG. 3 illustrates a block diagram of a system that facilitates computer program processing in accordance with an aspect of the disclosure. The system processing starts 300 and begins by parsing a computer program or portion thereof 320, such as exemplified in FIG. 2. For each top-level expression, the resultant abstract syntax tree 215 is used to generate an Atomic Expression Body 110 for storage in the Software Database 400. The system assigns unique identifiers in the Atomic Expression Body 110 for each referent identifier (e.g. variable, function, or class name) in the abstract syntax tree 215. The actual identifier names utilized in a computer program are annotated 360 upon the Human Database 410 and associated with their corresponding node in the abstract syntax tree 215 of the Software Database 400 and the system processing stops 380.

Figure 4:
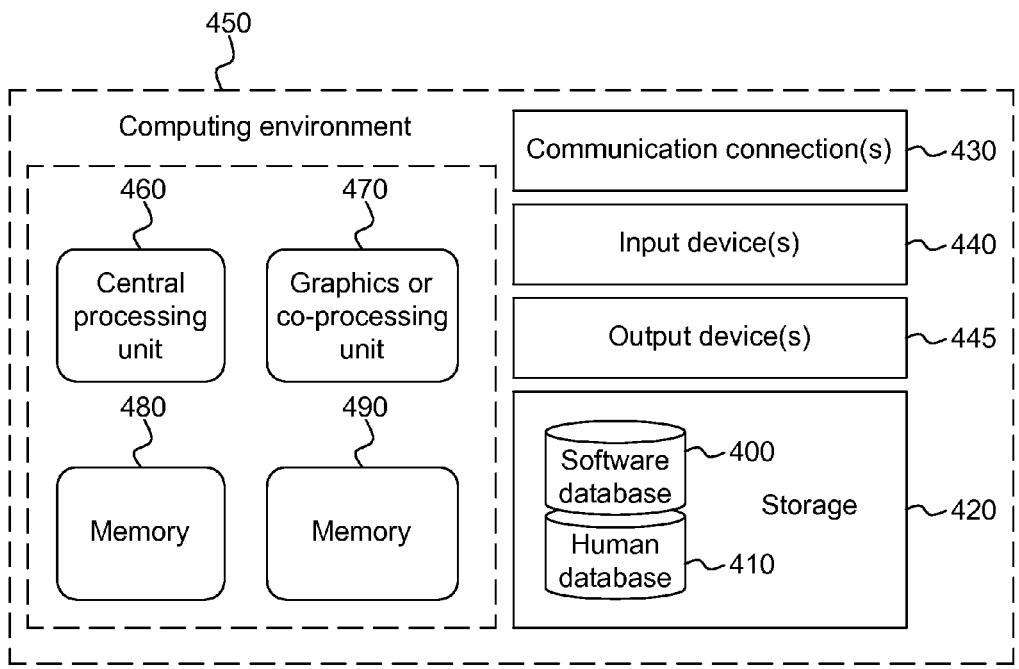
FIG. 4 illustrates an exemplary computing system in which some described embodiments can be implemented.

FIG. 4 illustrates exemplary computing system in which some described embodiments can be implemented. A computing environment 450 contains central processing unit 460 and associated memory 480 together with a graphics processing unit or other co-processing unit 470 and associated memory 490. Computing environment 450 also includes communication connection(s) 430 (e.g. Ethernet), input device(s) 440 (e.g. mouse and/or keyboard), output device(s) (e.g. display monitor and/or speaker), and persistent storage 420 (e.g. disk drive or solid state storage). Storage 420 includes a Software Database 400 and a Human Database 410.

After the files (compilation units) of a traditional file based system have been compiled, the next step is linking the resultant object files together. Linking entails taking external references within one compilation unit and connecting them to their definition within a separate compilation unit. For example, one file may include Code that calls a function that is defined in a separate, second file. When the object files for the two files are linked together, the call in the first object file is resolved to the definition in the second object file. Analogous to the link stage of building an executable, the database schema records the resolution of references to their definition. The Software Database 400 records a direct link between a reference in one Atomic Expression 100 and its definition in another Atomic Expression 100 rather than indirectly referring to its definition by name. Ultimately this means that the name of an object is only recorded once in the database at its definition and each reference points to the definition in the Software Database 400 and retrieves its Localized human readable name from the one definition in the Human Database 410 rather than referring to them by name as is done in traditional file based systems. This allows for easy renaming of an object in just one location, the Human Database 410, and having all references in the Software Database 400 automatically show the new name in the human presentation by way of Localization of the Software Database 400. Additionally it allows for the one name to be customized based upon developer preferences such as translating into another language such as Spanish or even within a language to use a different name to match the style preferences of a particular developer.

3.2. Atomic Expression Tree

Every Atomic Expression 100 in the Software Database 400 preferably has an Atomic Expression Body 110 that is a complete top-level abstract syntax tree 215 of either an atomic definition 140 or an Atomic Declaration 120. The Atomic Expression 100 forms the root of an externals tree that represents, at the first level, the immediate external 108 Atomic Declarations 120 of the Atomic Expression 100 and with subsequent levels recursively providing Atomic Declarations 120 required by prior Atomic Declarations 120 until no more immediate externals 108 are found, at the leaves of the externals tree. Each Atomic Declaration 120 may itself be associated with Atomic Expression Trees, each of which provides an atomic definition 140 through unique definitions 124 for the Atomic Declaration 120. Some Atomic Declarations 120 stand on their own and have no additional information and have no definitions 124, for example a C++ typedef declaration has no further information in a definition, as the declaration is complete, whereas a C++ function declaration has exactly one definition in a body that defines the behavior of the function in its definition. Finally, a C++ class declaration may declare a plurality of member functions and thus require multiple definitions, one for each member function declared. When a function is requested to be inlined, its definition may still be separated out from the declaration.

Figure 6:
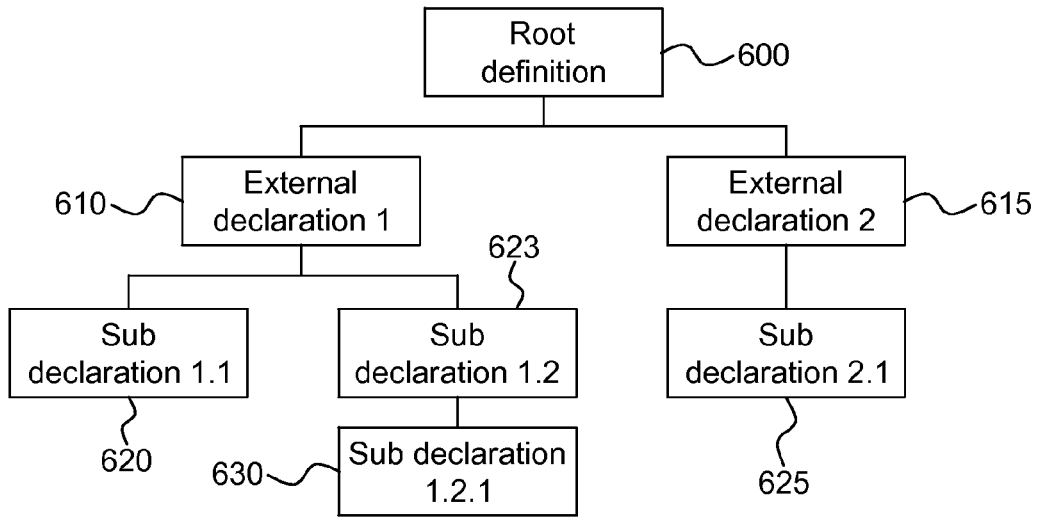
FIG. 6 illustrates a diagram of an exemplary abstract Atomic Expression Tree.

FIG. 6 is a block diagram of an exemplary Atomic Expression Tree. An exemplary root definition 600 corresponds to an Atomic Expression 100 and has two immediate externals 108 Atomic Declarations 120 in external declaration 1 610 and external declaration 2 615. The external declaration 2 615, itself has one immediate external 108 Atomic Declaration 120 shown as sub declaration 2.1 625, which has no dependencies and thus is a leaf in the Atomic Expression Tree. The external declaration 1 610, has two immediate external 108 Atomic Declarations 120 shown as sub declaration 1.1 620 and sub declaration 1.2 623. The sub declaration 1.1 620 has no immediate externals 108, and thus is a leaf in the Atomic Expression Tree. The sub declaration 1.2 623 has one immediate external 108 in sub declaration 1.2.1 630, which does not have any external dependencies, and thus is also a leaf in the Atomic Expression Tree.

3.3. C++ Language Example

In the following example, typography such as whitespace is arbitrarily chosen for the purpose of conveying the example but such details are not part of the Atomic Expression 100 stored in the Software Database 400. The following example details a complete Atomic Expression Tree from its root definition all the way down to all the declarations required for that definition:

Here is an example of a C++ Atomic Expression Definition 140:

```
index test::current(cursor value) {
    static index count=0;
    return++count+value;
}
```

This definition is combined with a reference to the following external Atomic Expression Declaration 120 to create an Atomic Expression 100:

```
struct test {
    index current(cursor value);
    // Other parts of the class, as for example the
    // following are not defined in the tree of this
    // Atomic Expression.
    index next(cursor value);
};
```

This declaration is combined with a reference to the following two external Atomic Expression Declarations 120 to create another Atomic Expression 100:

```
typedef int index;
typedef int cursor;
```

These two declarations each have an empty set of immediate externals 108 and each represent a terminal leaf node in the declaration tree emanating from the example Atomic Expression Definition 140 given in this section.

Figure 7:
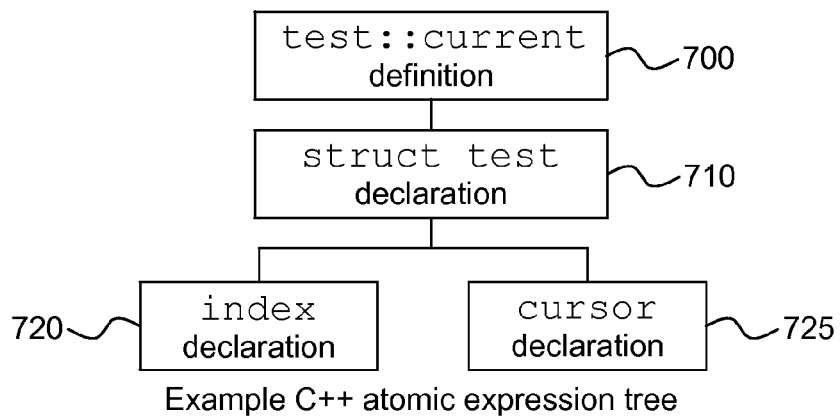
FIG. 7 illustrates a diagram of an exemplary C++ Atomic Expression Tree.

FIG. 7 is a block diagram of an exemplary C++ Atomic Expression Tree that corresponds to the example described above. The root of the Atomic Expression Tree is the test::current function definition 700. It has one immediate external 108 of the struct test declaration 710, which itself has two immediate externals 108 of the index declaration 720 and the cursor declaration 725, each of which is a leaf of the Atomic Expression Tree due to not having any further dependencies in immediate externals 108.

4. Database Projection into Smart Editor

When a software developer wishes to view and/or edit the Code of the Software Database 400, they may employ a smart editor to configure how the software is presented by way of Localization. For languages like C++, the typography of indentation and whitespace between tokens has no effect on the resulting application's execution or behavior. Therefore, a developer may configure rules that define how line breaks, indentation, and other whitespace should preferably appear to them in their Localization. Such configuration rules may be saved in the Human Database 410 and shared with other developers and may be changed on the fly while working on Code to provide whatever whitespace convention a developer wishes to see at any given time. An example of reformatting the appearance of source code files according to a style preference is disclosed in US Pat. Publication No. 20070011654 A1 (Published 2007 Jan. 11), for a "Method and apparatus for reformatting source code appearance".

Other types of style variations, other than whitespace, may also be configured for personal presentation by way of Localization preference. For example, in C++, the body of an if statement may omit surrounding curly braces when there is only one statement in the body, thus the following two examples are equivalent C++ and thus have the same Software Database 400 representation but one or the other will display depending upon how a developer prefers to see such cases as configured in their Human Database 410 profile:

```
if (condition) {
    doWork( );
}
if (condition)
    doWork( );
```

Another kind of style variation is name preferences for identifiers. Common variations are for the purpose of language Localization wherein a developer may see the names of identifiers in their own language (e.g. French) that may be shared with other users using the same language. Users may also have preferences within a language (e.g. English), for example, a user may wish to replace variables named i that supply the offset into an array with the more verbose index or idx. Another preference may be between naming styles such as CamelCaseNaming versus words_with_underscores_naming, which would for example, display a Localized function named restoreWorldContext( ) to one developer but the same might display Localized as restore_world_context( ) to another developer, depending upon their individual preferences.

Another kind of style variation is programming language preference. Rules may be created between programming languages (e.g. between C++ and Python) to allow a developer to work in a language agnostic fashion. As long as a language (or the subset of features being used) has an exact correspondence in another language, a Software Database 400 Localization may be used to project into the syntax and library of varying languages. This may, for example, allow the developer to experiment with the flexibility of an interpreted programming language such as Python while developing some Code and experimenting with it and later switch to C++ when building a final application to be delivered to an end user. An example of generalized expression trees for use across programming languages is disclosed in US Pat. Publication No. 20090328016 A1 (Published 2009 Dec. 31), for a "Generalized expression trees".

Another kind of style variation for Localization is ordering. Analysis of software, such as that done in a compiler, may reveal that several statements or expressions may be evaluated in any order (or in parallel) and result in the same effect. In the cases where current analysis may not detect where ordering is not relevant, the developer may annotate the Software Database with such parallel designations on statements. When statements and expressions are determined or annotated to be parallelizable, the smart editor may order them appropriately for the developer's current task. For example, elided sections may be moved out of focus when their ordering is not important with respect to other statements and expressions that are under the developer's focus.

Another aspect of database projection into a smart editor Localization is filtering. A developer may configure a Query into the Software Database to select those portions that are relevant to their current task. During execution, in a debugger, at a break point, a developer may wish to Query the functions currently on the stack or possibly only Query/see the function corresponding to the current frame. Within one or more functions, a developer may wish to hide or show selected/Queried portions; for example, a developer may only wish to see the portions of Code that refer to a particular variable they are investigating or a particular value that is being passed across frames and for which differing identifiers may be used from one frame to the next. When portions of a function are hidden, the locations where Code is being elided may be indicated (e.g. graphically) and the developer may be able to toggle their elision (e.g. by mouse click) and possibly, such as when shown, to elide a smaller portion or, such as when hidden, elide a greater portion. Elision is typically done at the statement or expression level of the software language. For example, when a developer is focused upon a particular variable for a task, all the references to the variable under focus may be ordered in their Localization as close together as possible so as not to change the meaning or behavior of the Code with respect to that variable and yet allow such Code to be more efficiently viewed, understood, and edited in the context of the current task.

Consider the following member function definition in C++:

```
void
Fletcher32::fletcher32_update(const byte input[ ], size_t bytes,
                u16bit& S1, u16bit& S2)
{
    const uint16_t *data = reinterpret_cast<const uint16_t *>(input);
    size_t words = bytes / 2;           // Truncate byte count to 16 bit words.
    const bool remainder = bytes % 2;    // Is there a byte left over?
    unsigned long long sum1 = static_cast<unsigned long long>(S1);
    unsigned long long sum2 = static_cast<unsigned long long>(S2);
    while (words >= 8) {
        sum2 += sum1 += data[0];    // 1
        sum2 += sum1 += data[1];    // 2
        sum2 += sum1 += data[2];    // 3
        sum2 += sum1 += data[3];    // 4
        sum2 += sum1 += data[4];    // 5
        sum2 += sum1 += data[5];    // 6
        sum2 += sum1 += data[6];    // 7
        sum2 += sum1 += data[7];    // 8
        words -= 8;
        data += 8;
    }
    switch (words) {
        case 7: sum2 += sum1 += *data++;
        case 6: sum2 += sum1 += *data++;
        case 5: sum2 += sum1 += *data++;
        case 4: sum2 += sum1 += *data++;
        case 3: sum2 += sum1 += *data++;
        case 2: sum2 += sum1 += *data++;
        case 1: sum2 += sum1 += *data;
        case 0: ;
    }
    if (remainder)
        sum2 += sum1 += input[bytes - 1];
    sum1 = (sum1 & 0xffffull) + (sum1 >> 16);
    sum1 = (sum1 & 0xffffull) + (sum1 >> 16);
    S1 = (sum1 & 0xffffull) + (sum1 >> 16);
    sum2 = (sum2 & 0xffffull) + (sum2 >> 16);
    sum2 = (sum2 & 0xffffull) + (sum2 >> 16);
    S2 = (sum2 & 0xffffull) + (sum2 >> 16);
}
```

If a developer was working on a task focused on the variable S1, the Code could instead be Localized/filtered and presented based on their preferences in the following exemplary form that only shows the portions affecting that variable S1, and eliding portions not affecting it for possible expansion on demand:

```
void
Fletcher32::fletcher32Update(const byte input[ ],
                size_t bytes,
                u16bit& S1,
                u16bit& S2)
{
    const uint16_t *data = reinterpret_cast<const uint16_t *>(input);
    size_t words = bytes / 2;           // Truncate byte count to 16 bit words.
    const bool remainder = bytes % 2;    // Is there a byte left over?
    unsigned long long sum1 = static_cast<unsigned long long>(S1);
    while (words >= 8) {
        sum1 += data[0];    // 1
        sum1 += data[1];    // 2
        sum1 += data[2];    // 3
        sum1 += data[3];    // 4
        sum1 += data[4];    // 5
        sum1 += data[5];    // 6
        sum1 += data[6];    // 7
        sum1 += data[7];    // 8
        words -= 8;
        data += 8;
    }
    switch (words) {
        case 7: sum1 += *data++;
        case 6: sum1 += *data++;
        case 5: sum1 += *data++;
        case 4: sum1 += *data++;
        case 3: sum1 += *data++;
        case 2: sum1 += *data++;
        case 1: sum1 += *data;
        case 0: ;
    }
    if (remainder) {
        sum1 += input[bytes - 1];
    }
    sum1 = (sum1 & 0xffffull) + (sum1 >> 16);
    sum1 = (sum1 & 0xffffull) + (sum1 >> 16);
    S1 = (sum1 & 0xffffull) + (sum1 >> 16);
}
```

Smart editor Localization/filtering allows the developer to select the values for preprocessor variables in programming languages like C or C++ and the developer is then only presented with the subset of the Code that corresponds to what is passed to the compiler after the preprocessor step. Such preprocessor value selection by the developer may allow a plurality of values to be selected, resulting in preprocessor directives remaining to distinguish between the plurality of values selected by the developer. For example, a developer may choose the –D preprocessor values that they would normally cause to be supplied to the compiler to view the source Code for a particular task such as for porting to a particular platform (e.g. Linux or Windows) or for a particular architecture (e.g. 32 bit pointers or 64 bit pointers). Alternatively, the Software Database 400 may store source Code distinct variations, across what is traditionally recorded as preprocessor conditions, as a dimension perpendicular to the software versioning system in the Software Database 400. One method of doing this is to group together a subtree of a parse tree in the Software Database 400 that corresponds to a Code snippet of an Atomic Expression Definition 140 for which preprocessor conditions apply and provide one or more variations of that subtree that correspond to different combinations of preprocessor variable settings with versioning being applied to the Atomic Expression Definition 140 as a whole. Thus each node in the tree of an Atomic Expression Definition 140 may optionally be associated with a preprocessor condition, such conditions being used to select the appropriate node variation with child nodes of each variation offering the possibility of further preprocessor condition refinement additively extending the satisfied conditions in parent nodes. The smart editor may present the variations side-by-side for easy comparison and review, possibly highlighting portions that differ between the variations.

An example of Code completion in an IDE is disclosed in U.S. Pat. No. 7,296,264 B2 (Published 2007 Nov. 13), for a "System and method for performing code completion in an integrated development environment". A Code base that is stored in a database, allows for improved Code completion based upon the contextual location within the smart editor. Rather than offering all possible completions, the developer may be presented with just those completions that would be resolvable by the compiler in the current context. For example, local variables that are out of scope at the insertion point in an editor may not be offered as possible completions. Further, the Code completions are Localized into the projected view selected by the developer's preferences, such as their language or naming convention styles.

5. Database Projection into Discrete Files

Figure 5:
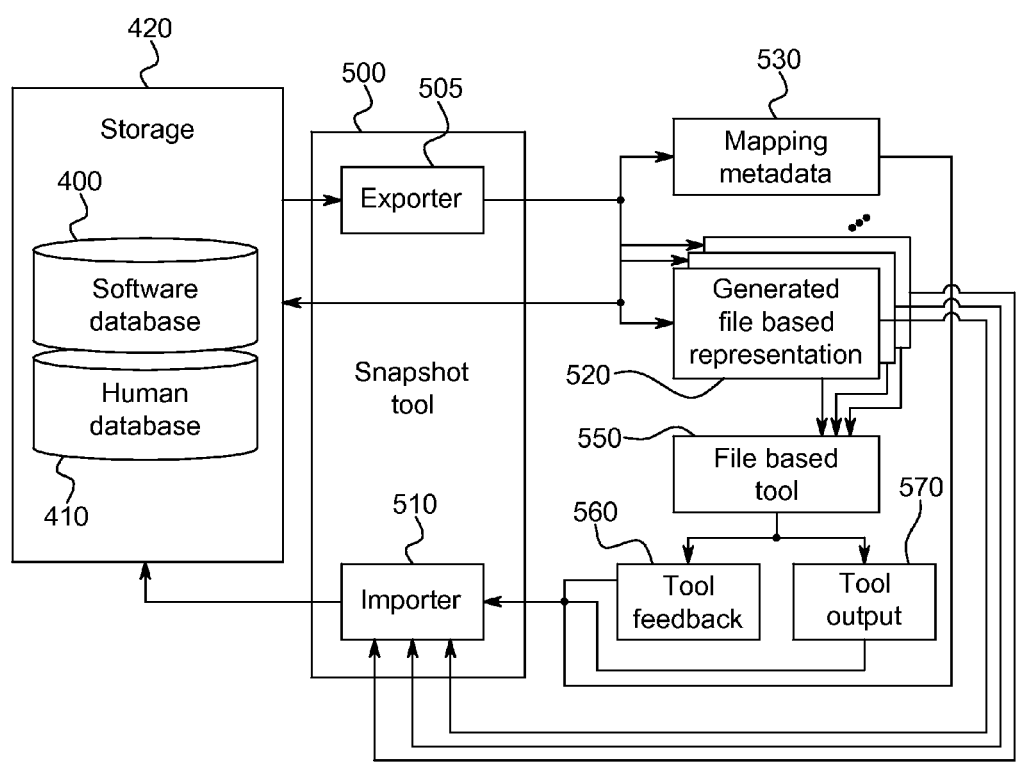
FIG. 5 illustrates a flow chart showing how to map back and forth between a Software Database and a traditional set of software source Code files.

To facilitate the transition to this new software development methodology, the system preferably provides a bridge process to allow existing file based tools to be integrated before such tools have been adapted to work directly with the new Software Database 400 representation. As shown in FIG. 5, this may be done by providing a snapshot tool 500 with an exporter 505 to project a snapshot of the Software Database 400 representation at a given point in time, in other words a specific selected version of the Code, into a generated file based representation 520 of discrete files compatible with existing software tools 550 that are oriented toward the file based software development methodology that is prevalent today. Such exports may assign names to identifiers based upon the Localization preferences selected in Human Database 410. This allows exporting to match the language and preferences expected and thus may allow for global debugging symbols to match the names a developer sees in their smart editor Localization projection. The exporter 505 also creates mapping metadata 530 that indexes the generated file based representation 520 back into the corresponding portions of the Software Database 400. Such indexing may correlate file names and positions or ranges within the files to identifiers and expression trees in the Software Database 400.

Alternatively, exporter 505 may assign unique names to identifiers based upon a hashing mechanism recorded in mapping metadata 530 such that the unique hashing name may be used to uniquely designate the corresponding identifier within the Software Database 400 to which the identifier in the exported files 520 corresponds. In this way, a single set of discrete exported files 520 may be shared and used independently of the Human Database 410, whereupon, any output 570 or messages 560 from a tool may use the hashed name with mapping data 530 to locate the identifier referred to by the hashed name in the Software Database 400 and lookup the preferred corresponding Human Database 410 name for the current developer. Such output 570 or messages 560 may be translated with importer 510 to present translated output or messages that use the Human Database 410 identifier names that a particular developer expects, understands, and will recognize. Similarly, any contextual information such as references to positional ranges within a generated file 520 may be correspondingly translated to refer to positions within a smart editor view of the corresponding Software Database 400 Code with Human Database 410 presentation by way of Localization.

Similarly, importer 510 provides the reverse functionality of exporter 505 by taking a traditional file based set of software 520 and importing it into a new or existing Software Database 400 and Human Database 410 representation repository.

One application of projecting the Software Database 400 into discrete files 520 is for file based tools 550 such as for compiling an executable. For C++ applications, one method is to create a uniquely named file 520 for each Atomic Expression 100 such as for each function, class, and global variable. Such files 520 may have automatically generated unique names that may include a portion of the file name that is descriptive of the Atomic Expression 100 contained therein, optionally reflecting the identifier's name as shown to the developer in their smart editor Localization projection. Such C++ projections into files begin with a series of C++ include(s) corresponding to the Atomic Expression 100 immediate externals 108 declaring every external reference used within an Atomic Expression Body 110. Such C++ projections into files 520 may be for a particular set of preprocessor variable definitions or for a particular selected variation from the Software Database 400. The preprocessor step may be completed and included as a part of the projection into the files 520 by the exporter 505. Alternatively, the dependencies may be declared directly, without the use of include files that still require a preprocessor step. The complete projection may contain a large number of files that may be split across directories according to module designation information recorded in the Human Database 410.

Existing tools may give informational, warning, and/or error messages to the tool user as tool feedback 560 or produce their computational result as tool output 570 and these tool feedback 560 messages (e.g. compiler warnings) and tool output 570 (e.g. compiler object file output) may give, refer, encode, cross-reference, and/or include one or more contextual locations in one or more particular input files 520, possibly resolved to one or more particular lines, possibly further resolved to a particular character or range of characters on the lines (e.g. in file name "test.cpp" on line number 28, the characters 17 to 23). Such messages 560 and output 570 may refer to the discrete files 520 created by a database projection from exporter 505. (For example, a compiler may include symbols and debug information for use in a debugger in its tool output 570 that refers back to input files 520 or its warning messages in tool feedback 560 may refer to input files 520.) These are reversed mapped back to the database representation in storage 420 through the use of mapping metadata 530 that may also be stored as part of Human Database 410. The mapped information from tool feedback 560 is annotated on the corresponding statements or expressions in the Software Database 400. This allows the developer to see and use the tool feedback 560 and tool output 570 from the file based tools 550 within the context of their smart editor Localization projection. During the Software Database projection export 505 into discrete files 520, building up mapping tables (mapping metadata 530) in the Human Database 410, analogous to Emacs' TAGS tables, may facilitate this reverse mapping. Such mapping tables may associate textual locations or ranges of locations within the projected files 520 back to the corresponding tokens in the parse tree of the Software Database 400 from which they were projected (exported 505). Any existing tool (file based tool 550) that works on the projected files 520 and refers to a file location in their tool feedback 560 and tool output 570 can be cross-referenced against these mapping tables 530 to associate such feedback 560 and output 570 back to the corresponding objects in the Software Database 400 and thus allow the developer to continue to benefit from these tools 550 while staying within and maintaining the benefits of this improved software methodology system by having such feedback 560 and output 570 be presented and utilized in a form that is mapped back into the Software Database 400 where textual locations in files 520 are substituted with references to the corresponding objects in the Software Database 400.

Where the projection may take several forms, it may be the case that one form results in the exposure of a bug in a downstream application such as a compiler whereas another theoretically equivalent form may not. In such cases, the Software Database 400 may be configured with an override projection form to use instead of the default projection in the case that the default manifests a bug and the override avoids the bug in a file based tool 550. Such override configurations may be selected based upon the target file based tool 550, for example, only using a particular override when the target is the gcc compiler version 3.4.7. An example of automatically logging, controlling, and overriding compiler options is disclosed in U.S. Pat. No. 5,960,202 A (Published 1999 Sep. 28), entitled "Method and apparatus for automatically logging compiler options and/or overriding compiler options".

6. Build Process

Once a database 400 projection 505 into discrete files 520 is created, these files may be individually compiled and linked together to create the executable. As changes are made to the Software Database 400, only those files 520 affected by Software Database 400 modifications to have new content would be rewritten, thus allowing subsequent builds to be performed incrementally on just the changed portions of the software by use of the existing method employed by the traditional make system (e.g. as done with gnumake) of examining the file modification timestamp to determine when a file needs to be rebuilt. One of the files 520 is affected whenever its underlying Atomic Expression Body 110 is updated in the Software Database 400 or any of the Atomic Declarations 120 in the Atomic Expression's 100 Atomic Expression Tree is modified in the Software Database 400. Optionally, changes to the Human Database 410 may also trigger a regeneration to reflect any changes to the assigned names of identifiers used. Further, if the preprocessor step is incorporated into the projection into files 520, then each file of the build system is complete in and of itself, and only needs to be built upon a change to the file.

The build system make file rules may be automatically generated as part of the database 400 projection 505 into discrete files 520.

An example of automated systems for building an application is disclosed in US Pat. Publication No. 20130139132 A1 (Published 2013 May 30), entitled "Method and system for program building" and US Pat. Publication No. 20020199170 A1 (Published 2002 Dec. 26), entitled "Collection makefile generator".

7. Static Code Analysis

The Software Database 400 may be analyzed statically to look for and detect repeated patterns. Such patterns may be searched for independently of the Human Database 410 and solely based upon the Software Database 400 to permit searching of only Code based upon its meaning to the computer (independently of identifier names in the Human Database 410). The developer's choice of whitespace and particular names for identifiers within the Code does not affect the Code's meaning to the computer and therefore is advantageously disregarded when searching for patterns resulting in potentially additional matches than would be found by using a strictly textually based search. Patterns are searched based upon their abstract syntax tree 215 that is recorded in the Software Database 400 in Atomic Expressions 100. An example of tree pattern matching is disclosed in U.S. Pat. No. 6,292,938 B1 (Published 2001 Sep. 18), for "Retargeting optimized code by matching tree patterns in directed acyclic graphs". One purpose of such pattern searching is to detect plagiarism from one part to another in the system that would result in needless complexity and steal attribution from the original author. However, similar patterns may arise independently and offer an opportunity to be merged. Another purpose of such pattern searching is to detect possible programming errors based upon known patterns that are known to often be in error (e.g. the use of an assignment in a conditional expression instead of a comparison—if (foo=0) vs. if (foo==0)). An example of dynamic source Code analysis is disclosed in U.S. Pat. No. 7,478,367 B2 (Published 2009 Jan. 13), for a "Dynamic source code analyzer" and disclosed in U.S. Pat. No. 8,572,572 B2 (Published 2013 Oct. 29), for a "Dynamic source code analyzer".

Detecting Code that is copied from one part of a system of source Code to another in traditional source Code text files is known in the art. For example, the source Code analyzer PMD that is available at http://PMD.SourceForge.net contains a Copy/Paste Detector (CPD) that uses the Karp-Rabin string matching algorithm to efficiently locate replicated Code. Additionally the 2003 paper entitled "Winnowing: Local Algorithms for Document Fingerprinting" by Saul Schleimer et al. discusses this topic in the more general arena of documents (as opposed to the more specific case of documents that are source Code) and which has been applied to the Measure of Software Similarity (MOSS) system. Semantic Designs' has a product called Clone Doctor, which is a tool that aids the tracking and removal of duplicate Code to reduce maintenance cost. These examples of code copy detection operate on text files. By representing the software in a structured database instead of in traditional text based source Code files, duplication is more readily detected by allowing the detection software to work directly on parse tree which is the primary representation of the source Code in this system.

Other kinds of static analysis include Coverity's Prevent™ application and that disclosed in U.S. Pat. No. 7,340,726 B1 (Published 2008 Mar. 4), for a "Systems and methods for performing static analysis on source code". The techniques disclosed herein allow for the analysis to be done directly on the database 400 and thus done incrementally as the Code is modified in a smart editor and the parse tree is updated. This allows continually updated analysis to be presented by way of Localization as the developer modifies the Code.

8. Code Refactoring

After similar Code patterns are detected during static analysis, the developer may factor out the repeating pattern into a new abstraction to replace the repetitions. Wholesale replacement of such patterns with their new refactored representation is greatly simplified by a Software Database representation where tokens and parse trees are manipulated instead of raw text files, allowing a search for matching patterns to be replaced with a refactored pattern.

9. Code Review and Rating

Software developers collaborate and may create commentary, ask questions, or create other kinds of annotations. These annotations are preferably recorded in the Human Database 410 and may be created with respect to any object within the Software Database 400, including, Atomic Expressions, Subexpressions, identifiers, statements, functions, and classes.

One other kind of annotation is where developers may vote on any of the above objects in the Software Database. Votes may be either positive or negative and optionally may include a magnitude (e.g. on a 1 to 5 scale). Once a vote is placed, in some embodiments, it may not be changed unless the underlying software being voted upon/annotated is changed. A developer may be required to pay out of their reputation that is accrued through positive votes on Code they have created or edited in order to place a negative vote in order that such negative votes cost the caster reputation and thus are not given lightly.

Votes may be along one or more metrics, including: efficiency, simplicity, extensibility, pleasing looking, maintainability, testability, readability, and correct functionality. Code may be queried to locate Code that, for example, has low votes and needs improvement or high votes that represents good work to be emulated and learned from. An example of identifying aspects and analytics of source Code snippets from a database of source Code and metadata is disclosed in US Pat. Publication No. 20120331439 A1 (Published 2012 Dec. 27), for a "Software development automated analytics". Additionally, an example of systems for collaboration and feedback on Code snippets are disclosed in U.S. Pat. No. 8,572,560 B2 (Published 2013 Oct. 29), for a "Collaborative software development systems and methods providing automated programming assistance".

Such annotations may be utilized to Query the Software Database. For example, a beginner may Query the database to review highly rated Code to learn from their examples. Alternatively, a manager may wish to review the Code of a team member to see how their Code is being rated, how they respond to feedback, and what kinds of review feedback they provide to others in an effort to better manage the team member, provide constructive feedback, and create a measurable plan of action. Another example is Querying portions of the Code that are bug prone or rated poorly along some metric in order that such Code may be addressed for improvement such as by refactorization.

10. Version Control

The Software Database provides version control functionality analogous to existing version control tools such as Subversion® (SVN) or ClearCase®. However, whereas traditional version control operates at the granularity of versioning textual files, in this system, the granularity is preferably at the level of the Atomic Expression 100 language constructs as stored in the Software Database 400 as unique identities and independently of whitespace, naming conventions, and other textual variations that do not affect the meaning of the software being versioned.

By versioning Atomic Expressions 100 instead of text files that may be composed of source Code corresponding to more than one Atomic Expression, the chance of collisions is reduced between developers. As long as the developers are working on separate Atomic Expressions, their check-ins to the version control system do not collide with each other and the need for merging is consequently reduced. Further, any preferences for naming conventions, whitespace, and the like that do not affect the Software Database, do not result in superfluous versioning changes due to such preferences instead being stored in the Human Database, orthogonal to the Software Database versioning.

When editing Code in the smart editor, each time a user reaches a state of correctness, wherein an Atomic Expression 100 is syntactically correct and has no unresolved external references, a version may be automatically made into the version control system of the database on a private branch dedicated to a single developer's workflow. A parent branch may be used and merged up into whenever automated unit tests and/or system tests indicate an Atomic Expression is functioning correctly. Similarly, parent branches may be merged down into a developer branch by explicit request of branch owners to avoid arbitrary disruption during tasks that can reduce productivity when not controlled. An example of integration of versioning and editing in data repositories is disclosed in U.S. Pat. No. 5,805,889 A (Published 1998 Sep. 8), for a "System and method for integrating editing and versioning in data repositories".

Because Code is stored in the Software Database at a level that excludes non-meaningful information such as white space and identifier naming preferences, the number of collisions between users working on the same Atomic Expression is reduced. Further, when a collision does occur, the merge tool understands the syntax of the language being developed under and can therefore simplify the three-way merge process by matching up corresponding nodes in the colliding trees rather than matching up corresponding lines in colliding text files. By matching based upon syntax of a parse tree instead of matching based upon text in a source file, the three-way merge tool is better able to find corresponding portions of the colliding versions by taking into account the syntactical meaning of the Code and finding corresponding nodes in the three trees being merged.

An example of methods of version control in large-scale systems is are disclosed in U.S. Pat. No. 7,647,363 B2 (Published 2010 Jan. 12) for a "Revision control system for large-scale systems management". An example of rule-based methods of dynamic version control is disclosed in U.S. Pat. No. 5,649,200 A (Published 1997 Jul. 15), for a "Dynamic rule-based version control system".

11. Alternatives

Any of the disclosed methods can be implemented as computer-executable instructions or a computer program product stored on one or more computer-readable storage media and executed on a computing device (e.g., any available computing device, including smart phones or other mobile devices that include computing hardware). Computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). The term computer-readable storage media does not include signals and carrier waves.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the following claims. We therefore claim as our invention all that comes within the scope of these claims.

What is claimed is:

1. A computerized method for managing development of software source code comprising:
   receiving a portion of software source code comprising at least a first expression,
   generating a parse tree corresponding to the first expression, the parse tree comprised of one or more nodes and at least some of the nodes corresponding to a token,
   storing the parse tree in a structured data store that is organized in accordance with rules and constructs of one or more particular programming languages,
   storing source code formatting information, wherein the step of storing source code formatting information comprises storing the source code formatting information for a specific user in accordance with formatting information provided by the specific user,
   receiving a query for the first expression,
   querying the structured data store for the parse tree corresponding to the first expression, and
   converting the parse tree into a textual representation and providing the converted parse tree in a format in accordance with the formatting information.

2. The method of claim 1 wherein the structured data store is an object-oriented data store.

3. The method of claim 1 wherein the user provided formatting information comprises source code appearance oriented formatting information.

4. The method of claim 1 wherein the user provided formatting information comprises source code ordering oriented formatting information.

5. The method of claim 1 wherein the user provided formatting information comprises source code language localization oriented formatting information.

6. The method of claim 1 wherein the user provided formatting information comprises source code naming preference oriented formatting information.

7. The method of claim 1 wherein the user provided formatting information comprises source code computer language translation oriented formatting information.

8. The method of claim 1 further comprising running a background process that scans parse trees stored in the structured data store to identify repeated patterns, the repeated patterns comprised of unique identities, and flagging the repeated patterns for subsequent review.

9. The method of claim 1 wherein the structured data store has associated therewith auxiliary information, comprising information pertaining to voting information, associated with the first expression.

10. The method of claim 9 wherein the voting information comprises information indicative of efficiency of the first expression.

11. The method of claim 9 wherein the voting information comprises information indicative of maintainability of the first expression.

12. The method of claim 9 wherein the voting information comprises information indicative of testability of the first expression.

13. The method of claim 9 wherein the voting information comprises information indicative of simplicity of the first expression.

14. The method of claim 9 wherein the voting information comprises information indicative of extensibility of the first expression.

15. The method of claim 9 wherein the voting information comprises information indicative of functionality of the first expression.

16. A computer system for managing software development comprising:
   a structured data store that contains a plurality of parse trees, each of the parse trees corresponding to an expression of software source code, the structured data store organized in accordance with rules and constructs of one or more particular programming languages, the structured data store further containing source code formatting information,
   wherein the source code formatting information comprises source code formatting information for a specific user stored in accordance with formatting information provided by the specific user,
   querying means for querying the structured data store for software source code corresponding to one or more query terms in a search query, the querying means querying the structured data store for parse trees that correspond to the one or more terms in the search query, and
   formatting means for generating software source code in textual form from the parse trees that correspond to the one or more terms in the search query.

17. The computer system of claim 16 further comprising a snapshot tool with an exporter to project a snapshot of the structured data store for a given version into a generated file based representation of discrete files compatible with file based software development tools.

18. The computer system of claim 17 further comprising an importer for translating software source code contained in the file based representation into parse trees corresponding to the software source code.

19. A computerized method for managing software development comprising: mapping the organization of software source code of a project by, for each expression in the software source code, scanning a series of characters corresponding to a selected expression;

lexically analyzing the series of characters to generate a corresponding sequence of tokens;
categorizing each token; and
transforming each sequence of tokens to create a parse tree corresponding to the sequence of tokens;
storing each of the parse trees and each corresponding sequence of tokens in a structured database the database including a schema for a given programming language;
storing formatting information corresponding to user preferences for viewing the software source code, wherein storing the formatting information comprises storing the formatting information for a specific user in accordance with formatting information provided by the specific user;
retrieving from the database in response to a query for specified portions of the software source code, one or more parse trees corresponding to said query; and
providing the parse trees corresponding to the query and providing formatting information corresponding to user preferences for viewing software source code corresponding to the parse trees, the formatting information permitting viewing of the specified portions of the software source code as a textual representation.

* * * * *